United States Patent
Ng et al.

(10) Patent No.: US 6,320,351 B1
(45) Date of Patent: Nov. 20, 2001

(54) INTELLIGENT SWITCH FOR BATTERY

(75) Inventors: Wai Man Ng; Kong Fan Choi, both of Kowloon Bay (CN)

(73) Assignee: Sunlite Trading Limited, Kowloon Bay (CN)

( * ) Notice: Subject to any disclaimer, the term of this patent is extended or adjusted under 35 U.S.C. 154(b) by 0 days.

(21) Appl. No.: 09/769,226

(22) Filed: Jan. 24, 2001

Related U.S. Application Data

(63) Continuation-in-part of application No. 09/566,549, filed on May 8, 2000.

(51) Int. Cl.[7] .................................................. H01M 10/44
(52) U.S. Cl. ............................................ 320/104; 320/136
(58) Field of Search .................................. 320/103, 104, 320/134, 136

(56) References Cited

U.S. PATENT DOCUMENTS 5,528,445 * 6/1996 Cooke et al. .
5,583,751 * 12/1996 Nakazawa et al. .
5,621,304 * 4/1997 Kiuchi et al. .

* cited by examiner

Primary Examiner—Edward H. Tso
(74) Attorney, Agent, or Firm—Alix, Yale & Ristas, LLP

(57) ABSTRACT

An intelligent switch for preventing over discharge of a vehicle battery includes a switch connected to toggle between a first state for preventing current flow from the battery and a second state for allowing current flow from the battery. A voltage monitor provides a voltage signal indicative of the voltage level of the battery. A vibration sensor provides a vibration signal indicative of vehicle vibration. A controller is connected to receive the voltage signal and the vibration signal and generate a control signal for toggling the switch to the first state when no vibration of the vehicle is detected and the voltage level of the battery falls below a predetermined voltage threshold. The controller generates another control signal when vibration is detected to toggle the switch to the second state. Multiple voltage thresholds and associated timers are used to maintain an adequate battery charge level under variable load conditions.

40 Claims, 5 Drawing Sheets

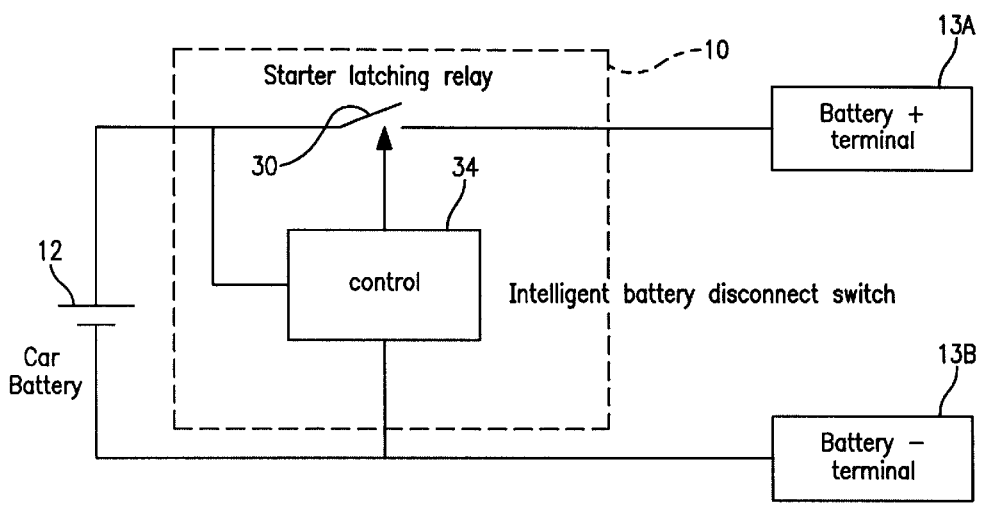
FIG. 2
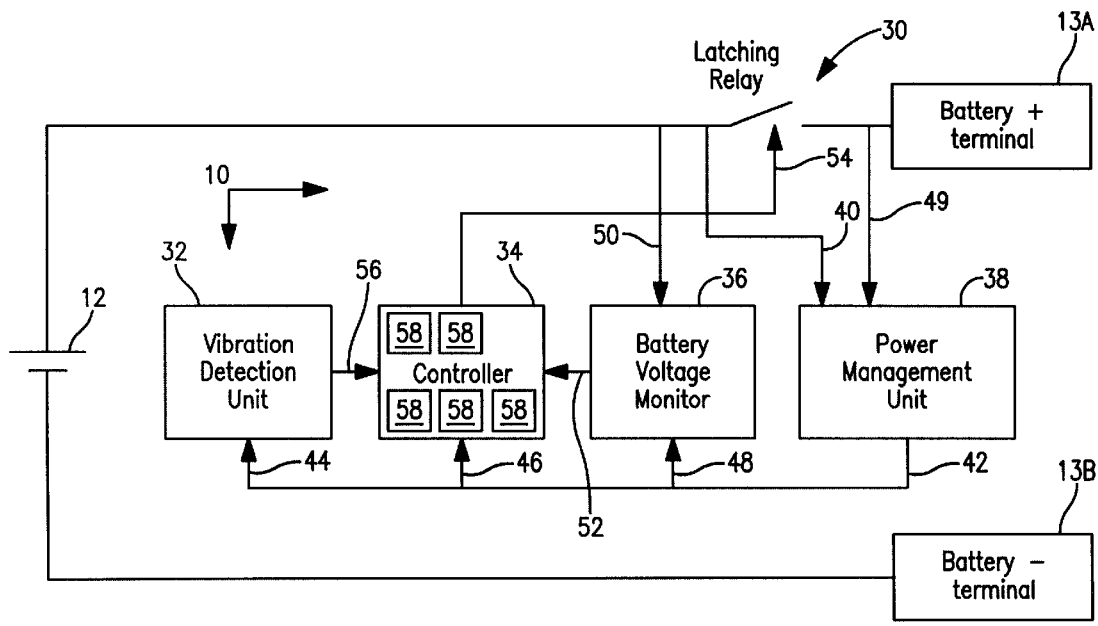
FIG. 4
| Loading | Voltage reference level | Timer length |
|---|---|---|
| 0.2 A | 12.4375 V | 22 hours |
| 1.0 A | 12.3125 V | 5.5 hours |
| 3.3 A | 12.1875 V | 24 minutes |
| 10 A | 12.125 V | 5 minutes |
| Greater than 25 A | 12.0 V | 10 second |
FIG. 5

INTELLIGENT SWITCH FOR BATTERY

CROSS REFERENCE TO RELATED APPLICATION

This is a continuation-in-part of U.S. application Ser. No. 09/566,549 filed May 8, 2000.

BACKGROUND OF THE INVENTION

1. Field of the Invention

The present invention relates generally to switches and, more particularly, to battery disconnect switches for preventing undesirable discharge of a battery.

2. Description of the Related Art

A rechargeable battery for use in providing initial energy for starting a motor of a vehicle, such as an automobile, a truck, a bus, a boat and most lawnmowers, is well known. As also well known, once the engine of the vehicle begins to run, an electrical generator provides power to recharge the battery and to energize an electrical load of the vehicle. The electrical load typically includes electrical appliances such as various lights, including safety and illumination lights, power accessories such as power door locks and power windows, and a radio. When the engine of the vehicle is not running, the electrical generator produces no power and the battery becomes the sole source. As most operators have experienced, a substantial risk of over discharging the battery arises when the engine is off and the load has not been disconnected from the battery such as in the case of an automobile where the headlights are left on after the engine has been shut off. In such a case, the battery may be discharged to a level where insufficient power exists to restart the engine of the vehicle—possibly causing the operator to be stranded. In addition, over discharging a battery will shorten the battery life because sulphuration may occur. Sulphuration involves an abnormal sulfate formed on the surface of the battery plates which hinders the battery plate from receiving and accepting a charge because of an increased resistance thereof.

Currently, disconnect switches are available for monitoring the state of the battery and disconnecting the battery from the electric load of the vehicle when the battery is discharging at a high rate or low rate after the engine has been shut off. However, these devices suffer from the drawback that once the battery has been disconnected from the electric load of the vehicle, they must be manually reset by the operator in order to start the engine.

SUMMARY OF THE INVENTION

Briefly stated, the invention in a preferred form is an intelligent switch for preventing undesirable discharge of a battery of a vehicle. The intelligent switch includes a switch connected in circuit with the battery that is configured to toggle between a first state for preventing current flow from the battery and a second state for allowing current flow from the battery. A voltage monitor is connected to the battery and is configured to provide a voltage signal indicative of the voltage level of the battery. A vibration sensor is configured to detect vibration of the vehicle and provide a vibration signal indicative thereof. A controller is connected to receive the voltage signal and the vibration signal and generate a control signal for toggling the switch to the first state when no vibration of the vehicle is detected and the voltage level of the battery falls below a predetermined voltage threshold and to the second state when vibration is detected regardless of the voltage level of the battery.

In a particular aspect of the invention, the voltage monitor is configured to output the voltage signal when the voltage from the battery falls below the predetermined voltage threshold, the voltage signal being detected by the controller.

In other aspects of the invention, the controller comprises a central processing unit, in particular, a microprocessor and a timer circuit for providing a predetermined delay between when the voltage level falls below the predetermined threshold value and the output of the control signal from the controller so that should vibrations be detected the control signal will not be output from the controller.

The battery may include a first part primarily for starting the engine of the vehicle and a second part primarily for supplying power to electrical load of the vehicle and connectable in parallel with the first part, to which battery parts the voltage monitor is connected. An intelligent switch configured for use in conjunction with such a battery includes first and second said switches connected in circuit with the first and second battery parts respectively. The controller is configured to generate a first control signal for toggling the first switch to the first state when no vibration of the vehicle is detected and the voltage level of the battery parts connected in parallel falls below a first predetermined voltage threshold. The controller generates a second control signal for toggling the second switch to the first state when no vibration of the vehicle is detected and the voltage level of the second battery part falls below a second, relatively lower predetermined voltage threshold.

To protect the battery against over discharge in different current drain situations, the controller is configured with at least two predetermined voltage thresholds. The intelligent switch includes at least two said timers associated with said predetermined voltage thresholds. A first of said timers counting a relatively longer predetermined period of time corresponding to the predetermined voltage threshold that is relatively higher, and a second timer being for counting a relatively shorter predetermined period of time corresponding to the predetermined voltage threshold that is relatively lower, etc.

A controller equipped with multiple voltage thresholds and multiple timers has the capability to more accurately measure the discharge condition of the battery. According to one aspect of the invention, the controller is configured with five said predetermined voltage thresholds. The intelligent switch includes a timer associated with each predetermined voltage threshold for counting respective predetermined periods of time the lengths of which increase or decrease with the levels of the corresponding voltage thresholds.

Advantageously, the timer is configured to stop counting when the voltage level of the battery rises back above the predetermined voltage threshold and to continue to count when the voltage level of the battery falls below the predetermined voltage threshold again for the uncounted part of the predetermined period of time. The controller is configured to generate said control signal for toggling the switch to the first state at the time when any one of the predetermined periods is counted to an end.

In another aspect of the invention, a method of preventing undesirable discharge of a battery for a vehicle, comprises the steps of: monitoring a voltage level of the battery and providing a voltage signal indicative of the voltage level; detecting vibration of the vehicle and providing a vibration signal indicative thereof; receiving the voltage signal and the vibration signal; generating a control signal based on the voltage signal when the voltage level from the battery falls below a predetermined threshold voltage level and based on the vibration signal when no vibration of the vehicle is detected, the control signal toggling a switch to a first state for preventing current flow from the battery; and generating another control signal for toggling the switch to a second state for allowing current flow from the battery when vibration is again detected.

The method further comprises the step of starting to count a first, relatively longer predetermined period of time when the voltage level from the battery falls below a first, relatively higher predetermined threshold voltage level, and the step of starting to count a second, relatively shorter predetermined period of time when the voltage level from the battery falls below a second, relatively lower predetermined threshold voltage level, prior to the generation of the control signal. The control signal is generated when any one of the predetermined periods is counted to an end.

An object of the present invention is to provide a new and improved intelligent switch that prevents over discharge of a battery.

Another object of the invention is to provide a new and improved intelligent switch that automatically resets itself after disconnection of the battery so that an operator may restart the vehicle.

A further object of the invention is to provide a new and improved intelligent switch for a battery that protects the battery from over discharge under variable load conditions.

A yet further object of the invention is to provide a new and improved intelligent switch for incorporation within the battery.

BRIEF DESCRIPTION OF THE DRAWINGS

FIG. 2 is a functional block diagram, partly in schematic, of the intelligent switch for battery of FIG. 1;

FIG. 4 is a schematic diagram of an alternative embodiment of the intelligent switch of FIG. 1;

FIG. 5 is a table illustrating the relationship between loading conditions, voltage reference levels and timer length for an embodiment of an intelligent switch in accordance with the present invention;

DETAILED DESCRIPTION OF THE INVENTION

Figure 1:
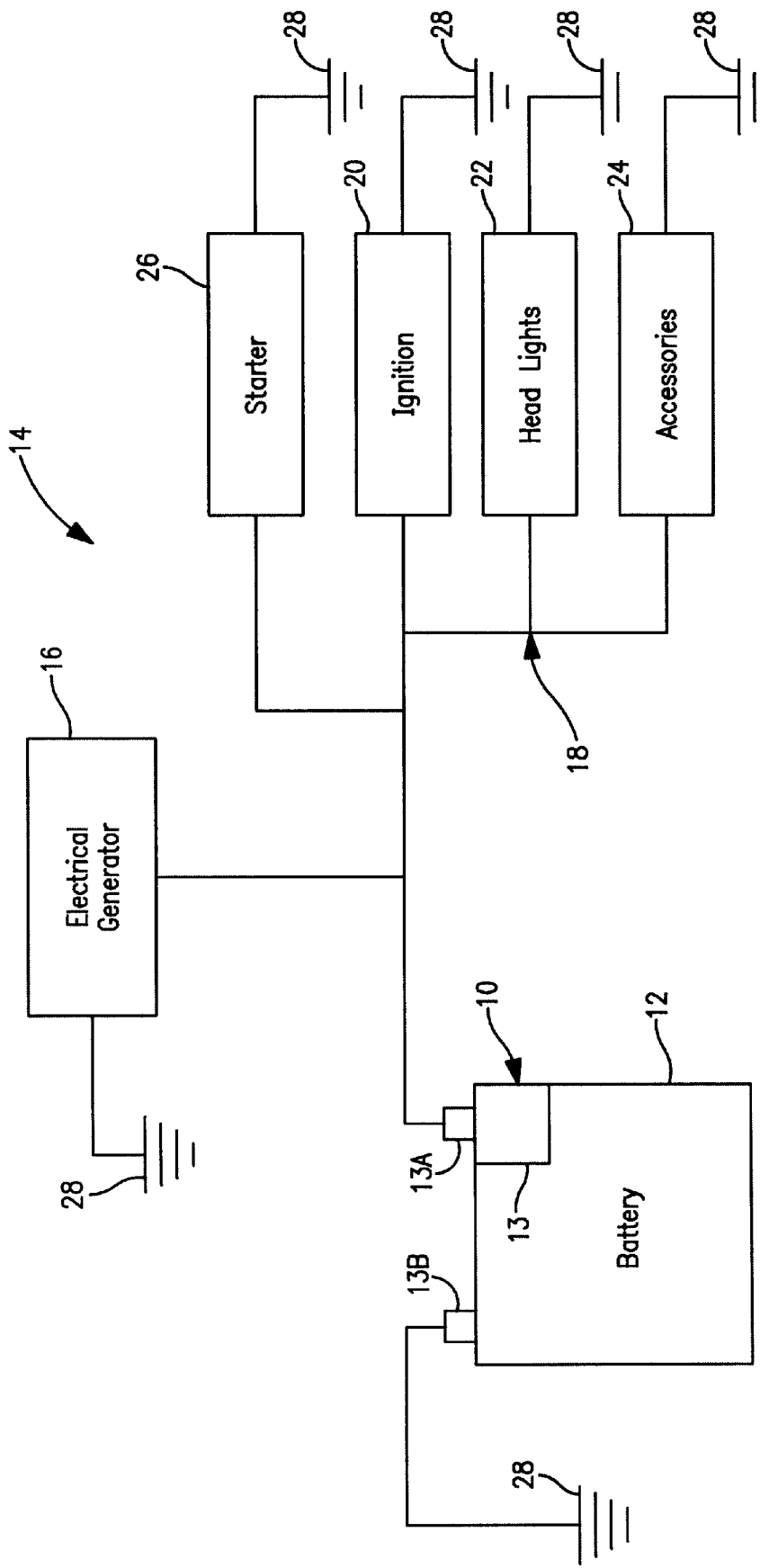
FIG. 1 is a schematic diagram of an electrical system for a vehicle incorporating an intelligent switch for a battery in accordance with an embodiment of the present invention.
Figure 3:
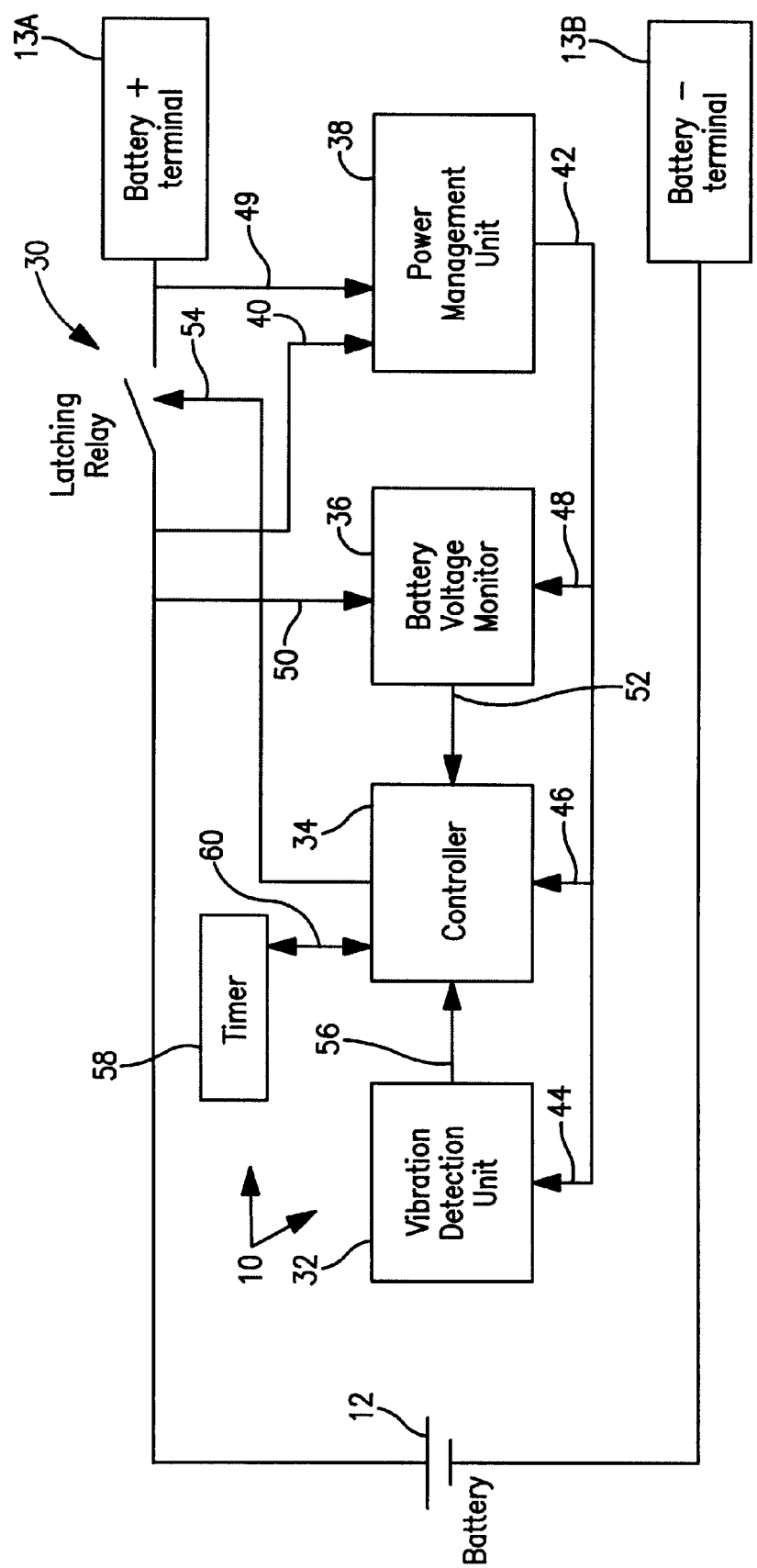
FIG. 3 is a schematic diagram of one embodiment of the intelligent switch of FIG. 1.

Referring to FIG. 1, an intelligent switch 10 is illustrated as being incorporated within a battery 12 via an internal switch box 13 and in circuit with a positive terminal 13A and a negative terminal 13B. It will be appreciated, however, that the intelligent switch 10 may instead be located externally of the battery 12 such as in an external switch box (not shown) and connected via wire (also not shown) to the battery 12. The intelligent switch 10 is shown for use in conjunction with a vehicle electrical system 14 such as a 12 volt system, although it will be appreciated that the intelligent switch may be employed with other suitable electrical systems employing a battery. The vehicle electrical system 14 may be used in conjunction with automobiles, trucks, buses, marine craft, lawn mowers, etc.

The electrical system 14 comprises an electrical generator 16 which turns mechanical energy from the vehicle motor (not shown) into electrical energy useful for energizing a load 18 of the electrical system 14. The load 18 may comprise an ignition system 20, headlights 22 and accessories 24. The ignition system 20, as is well known, may include a main coil and spark plugs (both not shown). The accessories 24 may include additional electronic devices such as a radio or a GPS navigational system. A starter 26 is further provided for cranking the vehicle motor (not shown) in a well known matter. A ground 28 completes the circuit between battery 12 and the electrical generator 16, load 18 and starter 26.

Referring now to FIG. 2, an intelligent switch in accordance with the present invention is illustrated generally at 10. The intelligent switch 10 is connected in circuit with the positive terminal 13A of the battery 12 via a switch 30 and also comprises a vibration detection unit 32, a controller 34, and a battery voltage monitor 36. A power management unit 38 may be provided for supplying the appropriate voltage and current to the switch 30, vibration detection unit 32, controller 34 and battery voltage monitor 36. The power management unit 38 may comprise a regulator as is well known and is connected to receive power from the battery 12 and input 40. An output 42 of the power management unit 38 provides power to the vibration detection unit 32, controller 34 and battery voltage monitor 36 shown by lines 44, 46 and 48, respectively. An additional lead 49 may be provided so that the power management unit 38 may function via an additional power source such as the vehicle generator 16 (FIG. 1) in the event battery 12 is discharged to a low voltage level and the switch 30 is in the open state.

The battery voltage monitor 36 includes an input 50 from the battery 12 and, in a preferred embodiment, functions to output a voltage signal on line 52 when the low voltage level of the battery 12 falls below a predetermined threshold of about 12.10 volts. The battery voltage monitor may be any suitable device for performing the foregoing function, although, it is preferably a voltage reference device sold by the S.C.S Thomson Corporation. The battery voltage monitor 36 may comprise a solid state circuit including, e.g., a comparator and an analog to digital (A/D) converter.

The switch 30 is shown in an open state and preferably comprises a MOSFET latching relay which functions to toggle between the open state and a closed state based upon a control signal input via line 54. When an electric circuit pulse is received, the switch 30 will toggle from one state to the other state and will remain until another electric current pulse is received. The latching relay is preferably an electromechanical device sold by the Glory Win International Group Ltd.

The vibration detection unit 32 functions to sense vibrations to, in turn, also identify when the vehicle is ready to be operated or is in operation. In particular, the vibration detection unit 32 senses any vibrations such as a door of the vehicle opening, an operator entering the vehicle and/or engine of the vehicle running and provides a vibration signal output via line 56. Preferably the presence of the vibration signal indicates that vibrations are sensed. The vibration detection unit 32 may comprise any suitable device for sensing vibration such as a piezoelectric disc or a magnetic sensor arranged to transform a mechanical force into electrical energy. Examples of a magnetic sensor useful in the practice of this invention include a magnetic field intensity sensor for sensing, e.g., a variation in the intensity of a magnetic field caused by physical vibration or movement of a magnet or a device for measuring variations in mutual inductance between magnetically coupled coils which may vibrate or move individually.

The controller 34 preferably comprises a central processing unit such as a microprocessor which is programmed to receive input from both the battery voltage monitor 36 and vibration detection unit 56 and output a control signal to drive, e.g., a MOSFET to deliver an electrical control pulse to the switch 30 via line 54. It will be appreciated that additional circuitry may be employed to shape or otherwise provide an appropriate control signal to the switch 30. Preferably, the controller 34 comprises a microprocessor manufactured by the S.C.S Thomson Corporation. However, it will be understood that the controller 34 may instead comprise a solid state electronic circuit comprising, e.g., one or more comparators and/or one or more electronic gates rather than a processor.

A timer 58 may optionally be employed to provide a delay time, as discussed below, of approximately thirty (30) seconds. The timer 58 communicates with the controller 34 via communication line 60. It will be appreciated, however, that the controller 34 may include a built-in timer. In addition, where the controller comprises a microprocessor the timer function may be provided via firmware or the like.

In operation, the controller 34 receives input from the battery voltage monitor 36 via line 52 and vibration detection unit 32 via line 56. When the vehicle has been shut down, vibration detection unit 32 will cease to provide a vibration signal to the controller 34. Should the voltage fall below a threshold voltage level of about 12.1 volts, the battery voltage monitor 52 will provide a low voltage signal to the controller 34. The controller, after a delay from timer 58 of about thirty (30) seconds will send a control pulse to the switch 30. The switch 30 will thus change from the closed state to the open state preventing flow of current from battery 12 to the load 18 (FIG. 1) of the vehicle. At this time, the controller 34 continuously monitors the vibration detection unit 32. Upon receiving a vibration signal from the vibration detection unit, the controller 34 will send another control pulse switching the switch 30 to the closed state and allowing transfer of energy from the battery 12 to the load 18 illustrated in FIG. 1.

The intelligent switch 10 is used to protect the battery 12 from damage by over discharge and to ensure that the battery 12 will always reserve sufficient power to start the vehicle, by disconnecting the battery 12 according to certain cut off criteria. The state of charge of the battery 12 is used as such cut off criteria, and one of the methods to determine the state of charge is to measure the output voltage of the battery 12. However, the output voltage is not directly proportional to the state of charge of the battery 12. Under different loading conditions, the terminal voltage is different for the same state of charge of the battery 12.

For example, with a small load such as a radio inside the car compartment (current drain at 0.2 A) draining 50% of the battery capacity, the terminal voltage may be lowered to 12.4V. In contrast, with a large load such as the headlights (current drain at 30 A) draining 50% of the battery capacity, the terminal voltage may be lowered to 11.8V.

With the use of a single voltage threshold or reference level to cut off the battery 12, for example 12.1V as described above, the remaining battery capacity will vary according to different loading conditions. If the voltage reference level is set to a relatively high level such as 12.4V, with a 0.2 A loading, the remaining battery capacity after cut off will be about 50% as intended. However, with a 30 A loading, the remaining battery capacity after cut off will be about 80%, which represents a premature cut off of power to the user. In contrast, if the voltage reference level is set to a relatively low level such as 11.8V, with a 30 A loading, the remaining battery capacity after cut off will be about 50% as intended, but with a 0.2 A loading, the battery will be severely over discharged at the same terminal voltage.

Accordingly, for the purpose of reserving the battery capacity at about 50% for various loading conditions after cut off, the use of a single voltage reference level is not practical. More than one or several voltage reference levels should preferably be used to cater for different load currents. In order to improve the performance of the described embodiment, five voltage reference levels are preset in the controller 34 and, in addition, five count down timers for counting different lengths of time are incorporated in the controller 34 corresponding to the voltage reference levels. The lengths of the timers are longer for higher voltage reference levels. An example of the settings of the voltage reference levels and associated timer lengths with respect to different loading currents for a typical model of the battery 12 is shown in FIG. 5, in that the timer lengths increase or decrease in the same order as the corresponding voltage thresholds. It should be noted that the settings will vary for batteries of different capacities and/or different electrical loads.

In operation, when the battery voltage falls below a voltage reference level, the corresponding timer will start to count down. When any one of the five timers counts to zero, the switch 30 cuts off the battery 12. The timers will continue to count even when the battery voltage falls below the next lower voltage reference level.

In the situation that the battery 12 is being discharged at a 0.2 A load current, the battery voltage will drop slowly. Upon the battery voltage falling below the first voltage reference level of 12.4375V, the first timer will start to count down for 22 hours. If the discharge current (rate of discharge) remains the same, the battery 12 is cut off by the switch 30 at the end of the 22-hour period. At this time, about 50% of the maximum capacity remains in the battery 12. It should be noted that the battery voltage will not reach the next lower or second voltage reference level by the end of the 22 hours.

In a different situation that the battery 12 is being discharged at a 1.0 A load current for example, the battery voltage will drop faster than under a 0.2 A loading condition. When the battery voltage falls below the first voltage reference level, the 22-hour timer will start to count down. Since the rate of voltage drop is faster, the battery voltage will fall below the second voltage reference level of 12.3125V before the first timer expires. Upon the battery voltage falling below the second voltage reference level, the second timer will start to count down for 5.5 hours. It should be noted that the first timer will continue to count even after the second timer has started to count. While the discharge current remains the same, the battery 12 will be cut off at the end of the 5.5-hour period. At this time, about 50% of the maximum capacity remains in the battery 12.

When the discharge current of the battery 12 is 3.3 A, the third timer will start to count down for 24 minutes upon the battery voltage falling below the third voltage reference level of 12.1875V. When the timer has expired, the battery 12 will be cut off to reserve about 50% of the maximum capacity. With the discharge current being 10 A, the fourth timer will start when the battery voltage falls below the fourth voltage reference level of 12.125V and count down for 5 minutes, at the end of which the battery 12 will be cut off. The fifth timer will start when the battery voltage falls below 12V, while the battery 12 is discharging at a current larger than 25 A, and count down for 10 seconds before the battery 12 is cut off.

The intelligent switch is also responsive to changing load conditions that switch between small and large load currents, such as user's switching on of a radio (current drain at 0.2 A) and automatic switching on and off of a cooling fan (current drain at 10 A). The first timer will start when battery voltage falls below the first voltage reference level (12.4375V). When the cooling fan is switched on, the battery voltage will fall rapidly to below the second level (12.3125V), then the third level (12.1875V) and eventually the fourth level (12.125V), with the second, third and fourth timers starting to count down at respective different moments.

If the cooling fan is switched off after a certain time period of say 3 minutes from the moment when the fourth timer started, the battery voltage will stop falling and rise up slowly to pass the fourth, third and second voltage reference levels sequentially. The timers will stop counting when the battery voltage rises back over the corresponding levels, but the counted value of each timer will not be cleared. The counted value is useful to indicate or record how much power has been drained out from the battery 12.

If the cooling fan is subsequently switched on again after say 10 minutes and when the battery voltage falls to below each next lower voltage reference level again, the corresponding timer will start to count from the value that it has previously counted and stopped at. When the battery voltage eventually falls below the fourth voltage reference level, the fourth timer will start to count down for only for the uncounted part that is 2 minutes because it has already counted 3 minutes on the previous occasion. At the expiry of the 2-minute period, the battery 12 will be cut off and there will be about 50% of the maximum capacity reserved in the battery 12.

All the timers will be reset automatically after the battery 12 has been charged up, as a result of the restarting of the vehicle engine, to above a predetermined high voltage level and for a predetermined period of time, such as above 13V for 1 minute.

Figure 6:
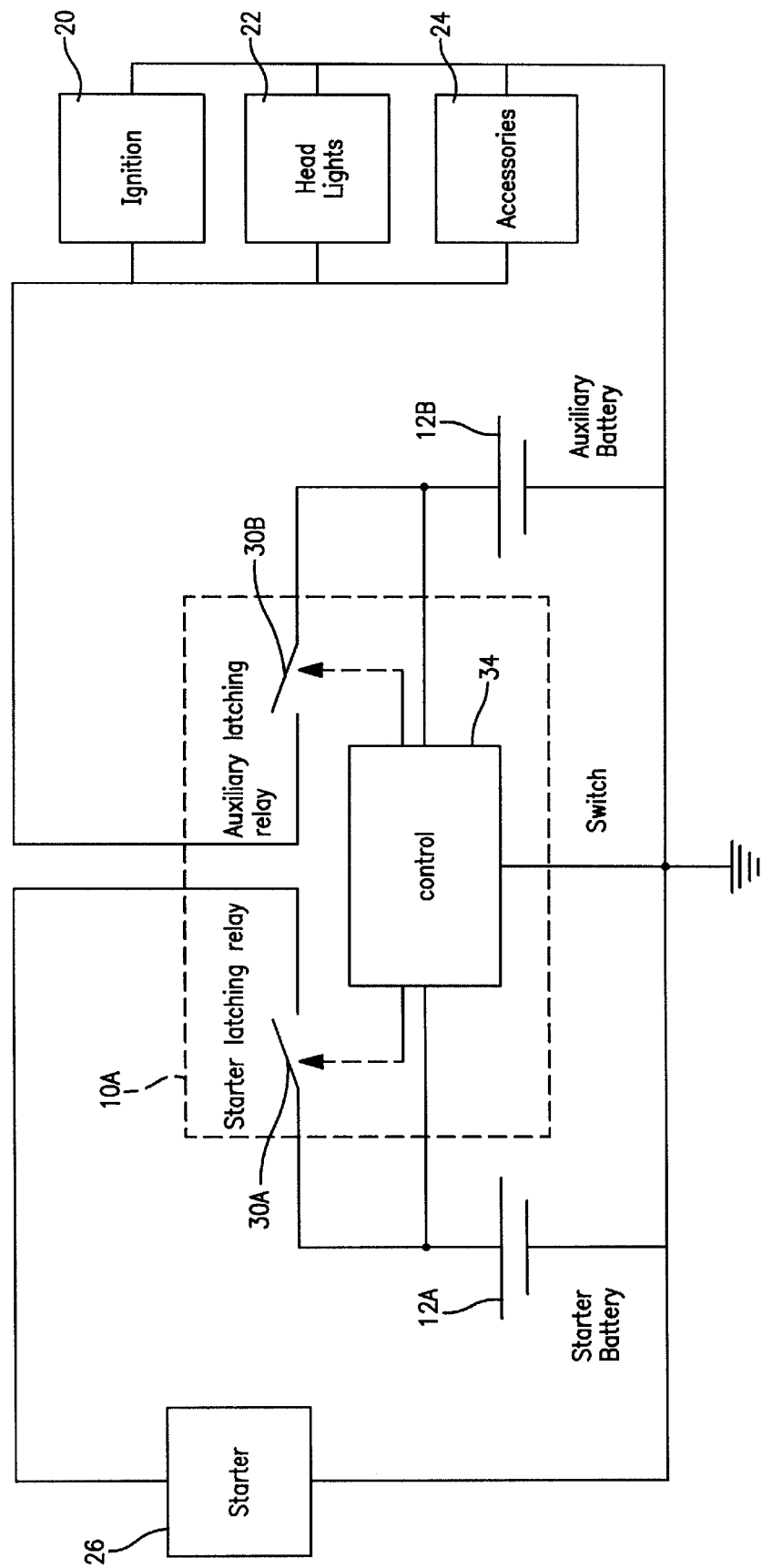
FIG. 6 is a functional block diagram, partly in schematic, of an alternative embodiment of an intelligent switch in accordance with the present invention.
Figure 7:
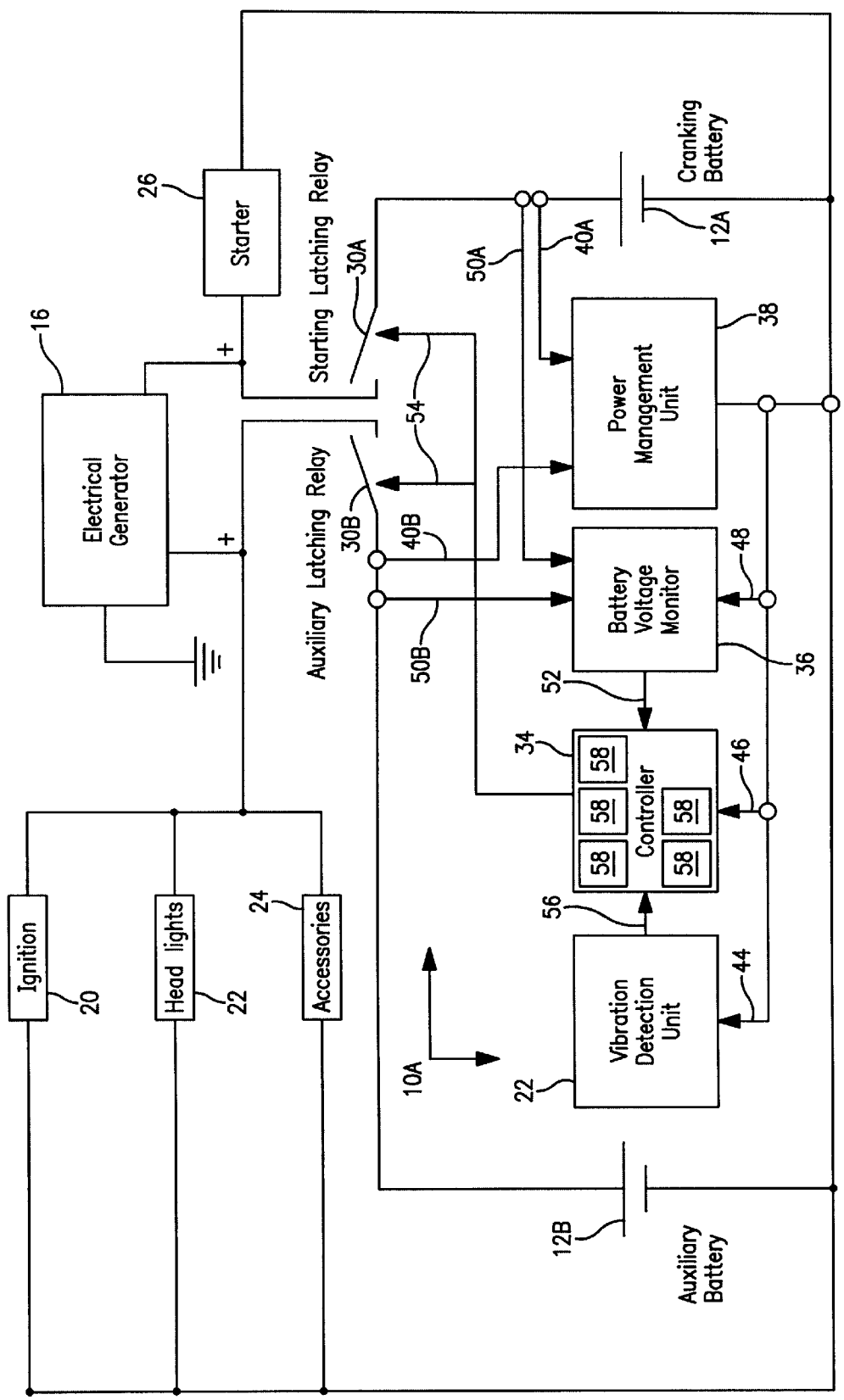
FIG. 7 is a schematic diagram of the intelligent switch of FIG. 6.

Reference is finally made to FIGS. 6 and 7. The use of the subject intelligent switch in conjunction with the aforesaid electrical system 14 can be extended to a 12-cell lead acid battery that consists of two parts connected in parallel. A first part of the battery acts as a cranking battery 12A and a second part acting as an auxiliary battery 12B. The cranking battery 12A is designed primarily for supplying a very large current to start the vehicle, and the auxiliary battery 12B primarily to withstand deep cycles of power consumption by accessories during periods when the vehicle charging system is not operating.

An alternative embodiment of the intelligent switch 10A is illustrated in FIGS. 6 and 7. The intelligent switch 10A has a configuration very similar to that of the first switch 10, with equivalent parts designated by the same reference numerals. Intelligent switch 10A incorporates a pair of starting and auxiliary latching relay switches 30A and 30B for cutting off the respective loads from the cranking and auxiliary batteries 12A and 12B respectively. Although the switches 30A and 30B are shown to be triggerable via the same line 54, they are responsive to distinctive control signals as provided by the controller 34 for independent switching. Alternatively, a separate line 54 may be used for the controller 34 to toggle each corresponding switch 30A or 30B.

Due to the presence of two batteries 12A and 12B and the use of separate switches 30A and 30B to control them, two lines 40A and 40B (equivalent to the aforesaid line 40) are included for supplying battery power to the power management unit 38. For the same reasons, two lines 50A and 50B (equivalent to the aforesaid line 50) are included for the battery voltage monitor 36 to monitor the output voltage of the batteries 12A and 12B.

The intelligent switch 10A is used to protect both of the cranking and auxiliary batteries 12A and 12B, which are connected in parallel for use, from damage due to over discharge. The intelligent switch also ensures that sufficient power is reserved in the cranking battery 12A to start the vehicle. In order to ensure that the cranking battery 12A always has sufficient power, the starting switch 30A should be opened whenever the vehicle is stopped with its engine shut down.

The battery voltage monitor 36 continuously monitors the voltage of the auxiliary and cranking batteries 12A and 12B. When the terminal voltage of the inter-connected batteries 12A and 12B is higher than 13.0V, the vehicle is running and the generator 16 of the vehicle is generating power, both of the starting and auxiliary switches 30A and 30B should be closed to enable charging of the batteries 12A and 12B. If the terminal voltage of the batteries 12A and 12B falls below 12.8V and the generator 16 is not generating any power, the starting switch 30A is toggled open after a time delay of say 30 seconds to disconnect the cranking battery 12A from the electrical load 18 of the vehicle. The cranking battery 12A will be re-connected automatically upon detection of vibration for restarting the vehicle.

Since the intelligent switch 10A always ensures that the cranking battery 12A has sufficient power reserved for starting the vehicle, the cranking battery 12A is always maintained at a high state of charge and therefore protected from damage by reason of over discharge.

The auxiliary battery 12B serves to supply power to operate the electrical load 18. The intelligent switch 10A also protects the auxiliary battery 12B from damage due to over discharge. When the vehicle is stopped with its engine off and the cranking battery 12A disconnected, the battery voltage monitor 36 will continue to monitor the status of the auxiliary battery 12B. When the headlights or radio are switched on, the remaining battery capacity will fall to a predetermined value of say 10.8V, whereupon the battery voltage monitor 36 detects it and then signals the controller 34 to open the auxiliary switch 30B to disconnect the auxiliary battery 12B after a time delay of say 30 seconds. Before the time delay expires, if the battery voltage rises back to a level higher than the predetermined value, the controller 34 will not disconnect the auxiliary battery 12B.

As the cranking battery 12A is dedicated to reserve sufficient power to start the vehicle, there is no need for the auxiliary battery 12B to retain too much power. Only a small percentage, say 5% to 10%, of the maximum capacity will need to be reserved in order to safeguard the auxiliary battery 12B against damage by over discharge, whereby the capacity of the auxiliary battery 12B can be fully utilized by the vehicle user.

While both the starting and the auxiliary switches 30A and 30B are open, when vibration is detected the controller 34 will initially close the starting switch 30A to connect the cranking battery 12A for starting the vehicle. After the vehicle has been started, the cranking battery 12A will be charged by the generator 16 of vehicle. When the voltage of cranking battery 12A rises to a predetermined level (say 13V), the auxiliary switch 30B will then be closed to enable the auxiliary battery 12B to be charged simultaneously with the cranking battery 12A.

While the present invention has been described in connection with what is presently considered to be the most practical and preferred embodiments, it is to be understood that the present invention is not limited to the disclosed embodiments. Rather, it is intended to cover all the various modifications and equivalent arrangements included within the spirit and scope of the appended claims.

What is claimed is:

1. An intelligent switch for preventing undesirable discharge of a battery of a vehicle, comprising:
    a switch connected in circuit with the battery and being configured to toggle between a first state for preventing current flow from the battery and a second state for allowing current flow from the battery;
    a voltage monitor connected to the battery and being configured to provide a voltage signal indicative of the voltage level of the battery;
    a vibration sensor configured to detect vibration of the vehicle and provide a vibration signal indicative thereof; and
    a controller connected to receive the voltage signal and the vibration signal and being configured to generate a control signal for toggling the switch to the first state when no vibration of the vehicle is detected and the voltage level of the battery falls below a predetermined voltage threshold and to the second state when vibration is detected regardless of the voltage level of the battery.

2. The intelligent switch of claim 1, wherein the voltage monitor is configured to output the voltage signal when the voltage from the battery falls below the predetermined voltage threshold, the voltage signal being detected by the controller.

3. The intelligent switch of claim 1, wherein the controller comprises a central processing unit.

4. The intelligent switch of claim 1, wherein the controller comprises a microprocessor.

5. The intelligent switch of claim 1, further comprising a timer circuit for providing a predetermined delay between when the voltage level falls below the predetermined threshold value and the output of the control signal from the controller so that should vibrations be detected the control signal will not be output from the controller.

6. The intelligent switch of claim 5, wherein the predetermined delay is about thirty seconds.

7. The intelligent switch of claim 1, wherein the switch comprises a latching relay.

8. The intelligent switch of claim 7, wherein the control signal comprises a control pulse.

9. The intelligent switch of claim 1, wherein the vibration sensor outputs a vibration signal upon vibration of the vehicle.

10. The intelligent switch of claim 9, wherein vibration sensor comprises a piezoelectric disc or a magnetic sensor.

11. The intelligent switch of claim 7 further comprising a power management unit for supplying power to the voltage monitor, vibration sensor, controller and latching relay.

12. The intelligent switch of claim 1, wherein the predetermined voltage threshold is approximately 12.1 volts.

13. The intelligent switch of claim 1 wherein the battery comprises a positive terminal and the intelligent switch is incorporated within the battery in circuit with the positive terminal.

14. An intelligent switch for preventing undesirable discharge of a battery for a vehicle, comprising:
    a switch connected in circuit with the battery and being configured to toggle between a first state for preventing current flow from the battery and a second state for allowing current flow from the battery;
    a voltage monitor connected to the battery and being configured to provide a low voltage signal when the voltage from the battery falls below a predetermined voltage threshold level;
    a vibration sensor configured to detect vibration of the vehicle and provide a vibration signal indicative thereof; and
    a controller connected to receive the low voltage signal and the vibration signal and being configured to generate a control signal for toggling the switch to the first state when no vibration of the vehicle is detected and to the second state when vibration is detected.

15. A method of preventing undesirable discharge of a battery for a vehicle, comprising the steps of:
    monitoring a voltage level of the battery and providing a voltage signal indicative of the voltage level;
    detecting vibration of the vehicle and providing a vibration signal indicative thereof;
    receiving the voltage signal and the vibration signal;
    generating a control signal based on the voltage signal when the voltage level from the battery falls below a predetermined threshold voltage level and based on the vibration signal when no vibration of the vehicle is detected, the control signal toggling a switch to a first state for preventing current flow from the battery; and
    generating another control signal for toggling the switch to a second state for allowing current flow from the battery when vibration is again detected.

16. The method of claim 15 further comprising the step of delaying the generation of the control signal after the voltage level falls below the predetermined voltage threshold value.

17. The method of claim 16, wherein the delay is about thirty seconds.

18. The method of claim 15, wherein the switch comprises a latching relay.

19. The method of claim 18, wherein the control signal comprises a control pulse.

20. The method of claim 15, wherein the predetermined voltage threshold value is about 12.1 volts.

21. An intelligent switch for preventing undesirable discharge of a rechargeable vehicle battery, comprising:
    a switch connected in circuit with the battery and being configured to toggle between a first state for preventing current flow from the battery and a second state for allowing current flow from the battery;
    a voltage monitor connected to the battery and being configured to provide a voltage signal indicative of the voltage level of the battery;
    a vibration sensor configured to detect vibration of the vehicle and provide a vibration signal indicative thereof;
    a controller connected to receive the voltage signal and the vibration signal and being configured to generate a control signal for toggling the switch to the first state when no vibration of the vehicle is detected subsequent to the voltage level of the battery falling below a predetermined voltage threshold and to the second state when vibration is detected; and at least one timer configured to start counting a predetermined period of time in response to the voltage level of the battery falling below the predetermined voltage threshold, at the end of which predetermined period of time the controller is to generate said control signal for toggling the switch to the first state.

22. The intelligent switch of claim 21, wherein the controller comprises a microprocessor.

23. The intelligent switch of claim 21, wherein the battery comprises a positive terminal and the intelligent switch is incorporated within the battery in circuit with the positive terminal.

24. The intelligent switch of claim 21, wherein the switch comprises a latching relay.

25. The intelligent switch of claim 21, wherein the vibration sensor comprises a piezoelectric disc or a magnetic sensor.

26. The intelligent switch of claim 24, further comprising a power management unit for supplying power to the voltage monitor, vibration sensor, controller, at least one timer and latching relay.

27. The intelligent switch of claim 21, wherein the battery is a battery for starting an engine of the vehicle.

28. The intelligent switch of claim 21, wherein the battery comprises a first part primarily for starting the engine of the vehicle and a second part primarily for supplying power to an electrical load of the vehicle, to which first and second battery parts the voltage monitor is connected, and the intelligent switch includes first and second said switches connected in circuit with the first and second battery parts respectively.

29. The intelligent switch of claim 28, wherein the controller is configured to generate a first control signal for toggling the first switch to the first state when no vibration of the vehicle is detected subsequent to the voltage level of the first battery part falling below a first predetermined voltage threshold and subsequently to generate a second control signal for toggling the second switch to the first state when no vibration of the vehicle is detected and the voltage level of the second battery part falls below a second predetermined voltage threshold, said second predetermined voltage threshold being lower than said first predetermined voltage threshold.

30. The intelligent switch of claim 29, wherein the first and second predetermined voltage thresholds are about 12.8 volts and 10.8 volts, respectively.

31. The intelligent switch of claim 21, wherein the controller is configured with at least two said predetermined voltage thresholds, and the intelligent switch includes one said timer associated with each said predetermined voltage threshold, a first of said timers being for counting a relatively longer predetermined period of time corresponding to the predetermined voltage threshold that is relatively higher, and a second of said timers being for counting a relatively shorter predetermined period of time corresponding to the predetermined voltage threshold that is relatively lower.

32. The intelligent switch of claim 31, wherein the controller is configured to generate said control signal when any one of the predetermined periods of time is counted to an end.

33. The intelligent switch of claim 21, wherein the controller is configured with five said predetermined voltage thresholds, and the intelligent switch includes one said timer associated with each predetermined voltage threshold for counting predetermined periods of time associated with each predetermined voltage threshold, the predetermined period of time associated with a higher voltage threshold being longer than the predetermined period of time associated with a relatively lower voltage threshold.

34. The intelligent switch of claim 33, wherein each timer is configured to stop counting when the voltage level of the battery rises back above the predetermined voltage threshold associated with the timer and to resume counting if the voltage level of the battery falls below the predetermined voltage threshold associated with the timer, said timer resuming said counting where said counting stopped and counting for a period of time corresponding to a remainder of said predetermined period of time associated with said timer.

35. The intelligent switch of claim 21, wherein each said at least one timer comprises a count down timer.

36. The intelligent switch of claim 34, wherein the controller is configured to generate said control signal when any one of the predetermined periods of time is counted to an end.

37. A method of preventing undesirable discharge of a battery for a vehicle, comprising the steps of:

monitoring a voltage level of the battery and providing a voltage signal indicative of the voltage level;

detecting vibration of the vehicle and providing a vibration signal indicative thereof;

receiving the voltage signal and the vibration signal;

generating a control signal based on the voltage signal when the voltage level from the battery falls below a predetermined threshold voltage level in the absence of vehicle vibration, the control signal toggling a switch to a first state for preventing current flow from the battery; and generating another control signal for toggling the switch to a second state for allowing current flow from the battery when vibration is again detected.

38. The method of claim 37, further comprising the step of delaying the generation of the control signal after the voltage level falls below the predetermined voltage threshold value.

39. The method of claim 38, wherein said step of delaying comprises the steps of starting to count a first predetermined period of time when the voltage level from the battery falls below a first predetermined threshold voltage level, and the step of starting to count a second, relatively shorter predetermined period of time when the voltage level from the battery falls below a second, relatively lower predetermined threshold voltage level, prior to the generation of the control signal.

40. The method of claim 39, wherein the control signal is generated when any one of the predetermined periods is counted to an end.

* * * * *